(12) United States Patent
Zhong et al.

(10) Patent No.: US 10,748,421 B2
(45) Date of Patent: Aug. 18, 2020

(54) METHOD FOR ESTIMATING DISTRIBUTION OF URBAN ROAD TRAVEL TIME IN CONSIDERING OPERATION STATE OF TAXI

(71) Applicant: Dalian University of Technology, Dalian, Liaoning Province (CN)

(72) Inventors: Shaopeng Zhong, Dalian (CN); Haimin Jun, Dalian (CN); Kai Liu, Dalian (CN); Quanzhi Wang, Dalian (CN); Kun Wang, Dalian (CN); Yanquan Zou, Dalian (CN); Lu Zhang, Dalian (CN); Tianli Tang, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 284 days.

(21) Appl. No.: 15/778,064

(22) PCT Filed: Sep. 21, 2017

(86) PCT No.: PCT/CN2017/102693
§ 371 (c)(1),
(2) Date: May 22, 2018

(87) PCT Pub. No.: WO2018/064931
PCT Pub. Date: Apr. 12, 2018

(65) Prior Publication Data
US 2018/0350237 A1    Dec. 6, 2018

(30) Foreign Application Priority Data
Oct. 8, 2016  (CN) .......................... 2016 1 0873710

(51) Int. Cl.
*G08G 1/127* (2006.01)
*G08G 1/00* (2006.01)
(Continued)

(52) U.S. Cl.
CPC ........... *G08G 1/127* (2013.01); *G06Q 10/047* (2013.01); *G06Q 10/0631* (2013.01);
(Continued)

(58) Field of Classification Search
CPC .... G08G 1/127; G08G 1/0112; G08G 1/0129; G08G 1/20; G08G 1/0125; G06Q 10/0631; G06Q 10/047; G06Q 50/30
See application file for complete search history.

(56) References Cited

U.S. PATENT DOCUMENTS

2008/0082251 A1* 4/2008 Ishikawa .............. G08G 1/0104
                                                            701/118
2010/0265074 A1* 10/2010 Namba .............. G06K 9/00845
                                                            340/576
(Continued)

FOREIGN PATENT DOCUMENTS

CN       101727746 A     6/2010
CN       101739823 A     6/2010
(Continued)

OTHER PUBLICATIONS

Full-Text Database, No. 3, Mar. 15, 2016; pp. 10-17 and 46-63; Chen, Jin; Study on Evaluation Methodology of Path Travel Time Reliability, Science-Engineering, China Master's Thesis.

*Primary Examiner* — Mary Cheung
(74) *Attorney, Agent, or Firm* — Muncy, Geissler, Olds & Lowe, P.C.

(57) ABSTRACT

The present invention relates to a method for estimating distribution of urban road travel time in considering operation state of taxi, and belongs to the technical field of urban
(Continued)

transportation planning and management. The distributions of path travel time are respectively estimated according to different operation states of the taxi. When the distribution of the path travel time is estimated, adjacent road sections in the road network are not independent. In the present invention, the Markov model is added to describe the correlation of the travel time distribution between the adjacent road sections, so as to increase science and accuracy of the estimation result. In the present invention, the weight is set according to the proportion of the number of the vehicles under two different operation states to obtain the final distribution of the path travel time. Driving behaviors of taxi drivers under two operation states of no passenger and passenger service may be different, so a difference between the travel time estimated from direct use of taxi data and a true value inevitably exists. The proposed model is calculated through Shenzhen data, which shows that the calculated travel time distribution function is more accurate after considering the operation states.

1 Claim, 5 Drawing Sheets

(51) Int. Cl.
*G08G 1/01* (2006.01)
*G06Q 50/30* (2012.01)
*G06Q 10/04* (2012.01)
*G06Q 10/06* (2012.01)

(52) U.S. Cl.
CPC ............ *G06Q 50/30* (2013.01); *G08G 1/0112* (2013.01); *G08G 1/0129* (2013.01); *G08G 1/20* (2013.01)

(56) References Cited

U.S. PATENT DOCUMENTS

| | | | | |
|---|---|---|---|---|
| 2013/0166350 | A1* | 6/2013 | Willemain | G06Q 30/0202 705/7.31 |
| 2014/0324267 | A1* | 10/2014 | Pfaff | G01C 21/34 701/25 |
| 2016/0202074 | A1* | 7/2016 | Woodard | G01C 21/34 701/465 |
| 2017/0228683 | A1* | 8/2017 | Hu | G08G 1/00 |

FOREIGN PATENT DOCUMENTS

| | | |
|---|---|---|
| CN | 104537836 A | 4/2015 |
| CN | 104778274 A | 7/2015 |
| CN | 106384509 A | 2/2017 |
| JP | 2011075345 A | 4/2011 |

* cited by examiner

Image of Link1 under "fast"  Image of Link3 under "slow"

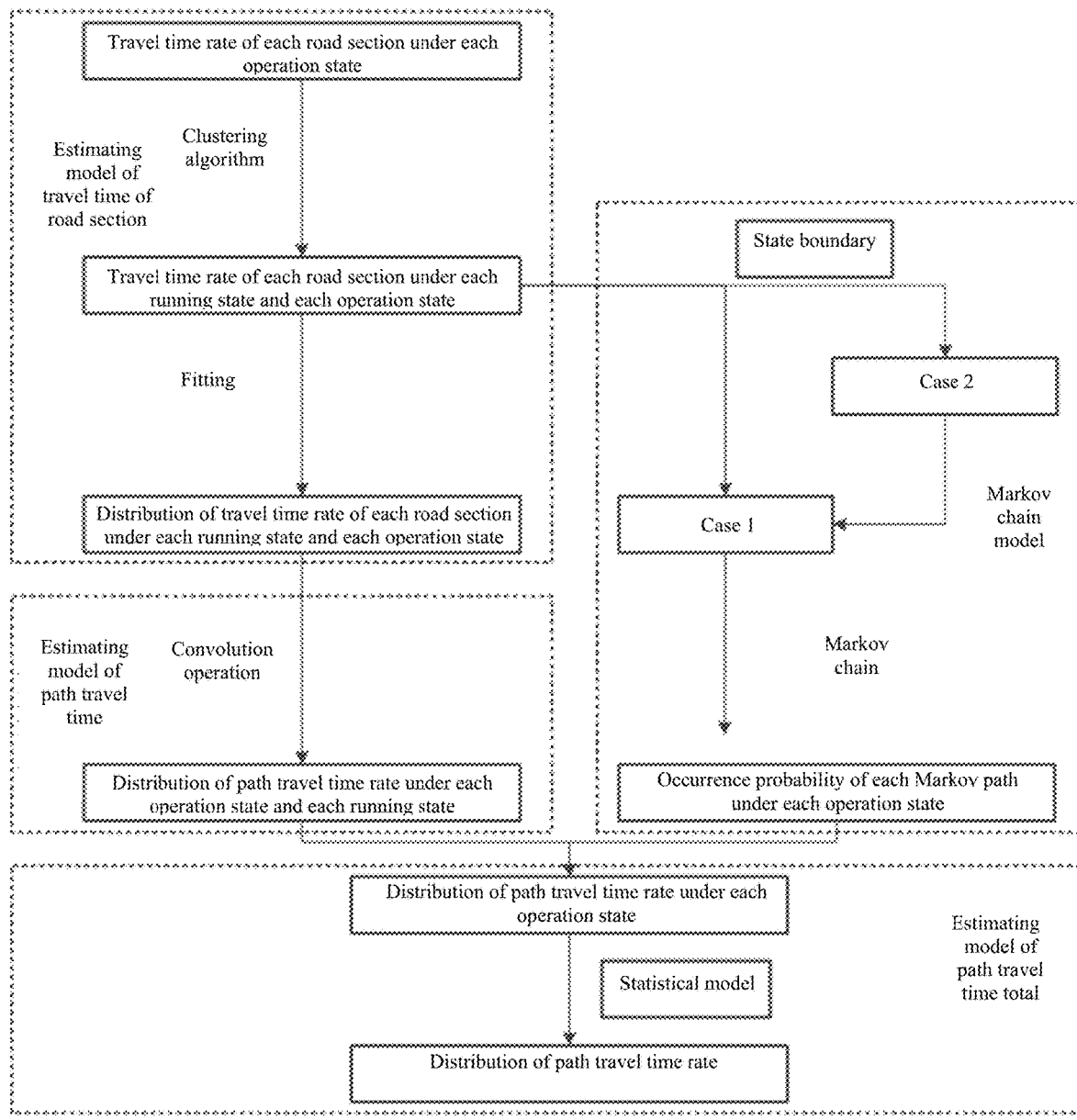
FIG. 9(As an illustration in Abstract)

METHOD FOR ESTIMATING DISTRIBUTION OF URBAN ROAD TRAVEL TIME IN CONSIDERING OPERATION STATE OF TAXI

TECHNICAL FIELD

The present invention belongs to the technical field of urban transportation planning and management, relates to the fields of travel time estimation for urban roads and ITS (intelligent transportation system), and is particularly suitable for estimation of distribution of urban path travel time based on taxi data.

BACKGROUND

In recent years, with the increasing seriousness of traffic jam and human attention to time value, the distribution of path travel time becomes one of the most concerned problems of travelers. At present, travel time estimation based on taxi data is used most widely because taxi have the advantages of wide coverage range, high timeliness, low cost of data collection and the like compared with other data sources. Jenelius E proposes a statistical method for travel time estimation for urban road networks using vehicle running tracks observed by low frequency GPS floating car in "Travel time estimation for urban road networks using low frequency probe vehicle data". Road section turning features and travel conditions are used as explanatory variables to depict influence factors behind temporal and spatial distribution of speed variation, which is quite practical for transportation forecast. Chen compares a method for travel time estimation based on road sections and a method for travel time estimation based on paths respectively using floating car data in "Dynamic Freeway Travel Time Prediction Using ProbeVehicle Data: Link-based vs. Path-based", then discusses the influence of the proportion of the floating car on estimation precision, proposes travel time estimation of road sections based on floating car data through kalman filtering, and conducts simulation verification.

With respect to such research methods, there are two problems currently: firstly, the distribution of travel time of each road section is simply superposed as distribution of path travel time, which may increase an error of estimation of the path travel time; secondly, driving behaviors of taxi drivers under two operation states of no passenger and passenger service may be different, so the difference of the driving behaviors inevitably result in a difference between a result of travel time estimation from direct use of taxi data and a true value. Based on this, the present invention proposes a method for more accurately estimating path travel time based on taxi data, and fully considers the influence of the operation states of the taxi on the travel time estimation of the path, thereby proposing a more accurate improvement method.

SUMMARY

The technical problem to be solved in the present invention is to firstly obtain the travel time distribution of each road section using taxi GPS data of each road section, then construct a model on this basis to estimate the distribution of the path travel time of the taxi in a certain operation state and finally set a weight according to the proportion of the quantities of the vehicles under two different operation states to obtain a final distribution of the path travel time.

The technical solution of the present invention is as follows:

A method for estimating distribution of urban road travel time in considering operation state of taxi, comprising the following steps:

(1) distribution of road section travel time screening, correcting and matching collected taxi GPS data according to road sections and time periods to be researched to obtain the taxi GPS data containing license plate numbers, precision, longitudes, latitudes, speeds and passenger carrying state fields on various road sections, recorded as Table a;

calculating the average speed of the taxi having the same license plate number according to the taxi GPS data in Table a, and calculating the travel time rate of the taxi having the same license plate number through a formula (1) according to the average speed of each taxi:

$$\mathcal{T}_i : =1/v_i (i=1,2,3 \ldots) \quad (1)$$

travel time on i road section in unit distance, called as the travel time rate, in s/m;

$v\mathcal{T}_i$: the average speed of a certain vehicle on the i road section;

establishing taxi data sheets containing the license plate numbers, the longitudes, the latitudes, the travel time rate and the passenger carrying state fields on various road sections, recorded as Table b; classifying the tables according to "no passenger" and "passenger service" (0 and 1) to obtain Table c with the passenger carrying state as 0 and Table d with the passenger carrying state as 1; then, clustering the data of the travel time rates in Table c and Table d through a clustering algorithm to obtain data of multiple running states in two operation states; and finally, fitting the data of the travel time rates of the taxi under the same running state to obtain a probability density distribution function of the travel time rates on each road section under each operation state and each running state;

(2) distribution model of path travel time under each operation state (2.1) construction of a Markov chain the travel time rate of the vehicles on the current road section is only determined by the upstream road section, but is irrelevant to the travel time rate of the previous road section; therefore, the spatial variation situation of the transportation on the current road section is similar to the structure of the Markov chain; the travel time rate of each road section on the path has typical Markov property; and the Markov chain can be used to model the correlation among the travel time rates of all road sections;

defining a concentrated distribution interval of the travel time rate of each taxi on the current road section as the state of the Markov chain, wherein $X_l = \{\chi_1^l, \chi_2^l, \ldots, \chi_{m_l-1}^l\}$ is a set of boundary values of link l; $m_l$ is the quantity of states of link l; $Z_l = \{\zeta_1^l, \zeta_2^l, \ldots, \zeta_{n_l-1}^l\}$ is a set of boundary values of link l+1; and $n_l$ is the quantity of states of link l+1; therefore, representing the first state of link l as $[\min \tau_l, \chi_1^l)$ and representing the last state as $[\chi_{m_l-1}^l, \max \tau_l]$, wherein $\tau_l$ represents the travel time rate of each taxi on link l;

defining the probability distribution of each running state on the road section link 1 as the probability distribution of an initial state of the Markov chain:

$$\pi = \begin{bmatrix} \pi_1 \\ \pi_2 \\ \vdots \\ \pi_{m_1} \end{bmatrix} = \begin{bmatrix} \frac{N(1)}{\sum_{i=1}^{m_1} N(i)} \\ \vdots \\ \frac{N(m_1)}{\sum_{i=1}^{m_1} N(i)} \end{bmatrix} \quad (2)$$

wherein N(i) represents the quantity of data points under state i of the road section link 1, for example, when the travel time rate of link 1 is within $[\chi_{i-1}^1, \chi_i^1)$;

defining the distributions of the travel time rates of two continuous road sections as state transfer probability of the Markov chain, and then representing the probability transfer matrix P in a generate state as:

$$P = \begin{bmatrix} p_{1,1} & \cdots & p_{1,j} \\ \vdots & \ddots & \vdots \\ p_{i,1} & \cdots & p_{i,j} \end{bmatrix} = \begin{bmatrix} \frac{N(1,1)}{\sum_{i=1}^{n_l} N(1,i)} & \cdots & \frac{N(1,n_l)}{\sum_{i=1}^{n_l} N(1,i)} \\ \vdots & \ddots & \vdots \\ \frac{N(m_l,1)}{\sum_{i=1}^{n_l} N(m_l,i)} & \cdots & \frac{N(m_l,n_l)}{\sum_{i=1}^{n_l} N(m_l,i)} \end{bmatrix} \quad (3)$$

$$p_{i,j} = Pr(S_{l+1} = j \mid S_l = i) \quad (4)$$

wherein $S_l$ represents the state of the road section link l; and N(i,j) represents the quantity of data points which are in i state on the road section link l and in the j state on the road section link l+1;

matched vehicles between the middle road section link l and the downstream road section link l−1 may be different from matched vehicles between the middle road section link l and the downstream road section link l+1; when the middle road section is used as the upstream road section or the downstream road section, classification conditions may be different, and are divided into two cases according to the difference:

(2.2) case 1 when any middle road section link l is used as the upstream road section or the downstream road section, the classifications of the running states are completely consistent; the vehicles are in any state of k different states of $Q = \Pi_{l=1}^k m_l$, l=1, 2, ... when passing through the path, and each state is called as the Markov path; for the given Markov path, the product of transfer probabilities among all states of all the road sections is the occurrence probability of the Markov path;

$$\Pr\{S_1=i_1, S_2=i^2, \ldots, S_k=i_k\} = \pi_{i_1} p_{i_1,i_2}^{S_1,S_2} p_{i_2,i_3}^{S_2,S_3} \ldots p_{i_{k-1},i_k}^{S_{k-1},S_k} \quad (5)$$

assuming that the distribution of the travel time rates among all states on the same road section is conditional independent, the distribution of the path travel time rate on a certain Markov path is obtained directly through convolution operation:

$$TTRD\{S_1=i_1, S_2=i_2, \ldots, S_k=i_k\} = TTD(i_1^{S_1}) * TTD(i_2^{S_2}) * \ldots * TTD(i_k^{S_k}) \quad (6)$$

in the formula, an operator (*) represents convolution operation, and specific operation rule is expressed as:

$$(TTRD_i * TTRD_j)(t) \triangleq \int_{-\infty}^{\infty} TTRD_i(\tau) TTRD_j(t-\tau) d\tau \quad (7)$$

(2.3) case 2 when any middle road section link l is used as the upstream road section and the downstream road section, the classifications of the states are inconsistent; therefore, the state of the Markov chain needs to be revised; transition road sections link' l and link" l (l=2, 3, ..., k−1) are introduced, wherein all the states of link'l are equal to those of link l as the downstream road section in the road section link l−1 and the road section link l; all the states of link"l are equal to those of link l as the upstream road section in the road section link l and the road section link l+1; a new road section sequence of the running process of the vehicles on the path is represented as link 1 ... link l−1, link'l, link" l, link l+1, ... link k; $X_l = \{\chi_1^l, \chi_2^l, \ldots, \chi_{m_l-1}^l\}$ is used as the set of boundary values of the transition road section link'l, $m_l$ is used as the quantity of states of link' l, $Z_l = \{\zeta_1^l, \zeta_2^l, \ldots, \zeta_{n_l-1}^l\}$ is the set of boundary values of the transition road section link"l, $n_l$ is used as the quantity of states of link"l, and $\tau_l$ represents the travel time rate of the taxi on link l; then, the state transfer probability matrix between the transition road section link'l and the transition road section link" l is $$P'_l = \begin{bmatrix} p'_{1,1} & \cdots & p'_{1,m_l} \\ \vdots & \ddots & \vdots \\ p'_{n_l,1} & \cdots & p'_{n_l,m_l} \end{bmatrix} \quad (8)$$

$$p'_{i,j} = Pr(ttr_l \in [\chi_{j-1}^l, \chi_j^l) \mid ttr_l \in [\zeta_{i-1}^{l-1}, \zeta_i^{l-1})) = \frac{N(\{ttr_l \in [\chi_{j-1}^l, \chi_j^l) \cap ttr_l \in [\zeta_{i-1}^{l-1}, \zeta_i^{l-1})\})}{M(\{ttr_l \in [\zeta_{i-1}^{l-1}, \zeta_i^{l-1})\})} \quad (9)$$

the new constructed Markov chain forms $= \Pi_{l=1}^{k-1} m_l \cdot n_l$ Markov paths; for the given new Markov path, the product of transfer probabilities among all states of all the road sections including the transition road section link'l and link"l is the occurrence probability of the Markov paths;

$$Pr\{S_1 = i_1, S_2 = i_2, S'_2 = i'_2, \ldots, S'_{k-1} = i'_{k-1}, S_k = i_k\} = \pi_{i_1} p_{i_1,i_2}^{S_1,S_2} p_{i_2,i'_2}^{S_2,S'_2} \ldots p_{i'_{k-1},i_{k-1}}^{S'_{k-1},S_{k-1}} p_{i_{k-1},i_k}^{S_{k-1},S_k} \quad (10)$$

similarly, using convolution operation to obtain the distribution of the path travel time rates of a certain new Markov path after considering the transition road sections link'l and link"l;

$$TTRD\{S_1 = i_1, S_2 = i_2, S'_2 = i'_2, \ldots, S_k = i_k\} = TTD(i_1^{S_1}) * TTD(i_2^{S_2} \cap i'_2^{S'_2}) * \ldots * TTD(i_k^{S_k}) \quad (11)$$

(2.4) superposition of distribution of path travel time it is known that the distribution of the travel time rate of each Markov path and the occurrence probability are superposed according to the Markov chain to obtain the distribution of the travel time rate of a certain path (the superposing method is shown in FIG. 1):

$$TTRD_{route} = \sum_{q=1}^{Q} Pr(\text{Markov path}_q) \cdot TTRD(\text{Markov path}_q) \quad (12)$$

(3) estimating model of total path travel time respectively calculating the distributions of the path travel time rates under two operation states through the method in step (2); then setting weights for respective distribution functions according to data amount under two operation states; the calculation formula of the distribution of the total path travel time rate is as follows:

$$TTRD(x) = \alpha_0 \cdot ttrd_0(x) + \alpha_1 \cdot ttrd_1(x) \quad (13)$$

wherein $ttrd_0(x)$ and $ttrd_1(x)$ respectively represent the probability density functions of the total path travel time rate under the state of no passenger and the state of passenger service; and $\alpha_0$ and $\alpha_1$ are proportion parameters which represent the proportion of the vehicles under each operation state in the total amount of the taxi, i.e., the ratio of no passenger and the passenger ratio of taxi.

The present invention has the following beneficial effects:

At present, the research on the road travel time often takes the road section as an object to discuss the travel time distribution of the road section, while the travel time estimation based on the path is often to simply superpose the travel time distribution of each road section. Facts prove that the travel time distribution of each road section in the road network is not independent, and vehicle running states between two adjacent road sections have strong correlation. Therefore, a traditional estimation method neglects spatial-temporal correlation between the road sections, which may produce a large estimation error. In the present invention, the Markov model is added to describe the correlation of the travel time distribution between the adjacent road sections, which may increase science and accuracy of the result to a great degree.

Although the taxi data can well reflect and simulate operating situations of vehicles or traffic flows in the road network, the driving behaviors and decisions of most of taxi drivers in the driving process are different from those of general travelers. The driving behaviors of the taxi drivers under two operation states of no passenger and passenger service are different. Therefore, a difference inevitably exists between the travel time estimated by directly using the taxi data and the true value. The present invention proposes to set a weight according to the proportion of the number of the vehicles under two different operation states to calculate the final distribution of the path travel time, and to make calculation to the proposed model through Shenzhen data, and finds that the calculated travel time distribution function is more accurate after considering the operation states.

DESCRIPTION OF DRAWINGS

FIG. 9 is a flow chart of a method for estimating distribution of urban road travel time in considering operation states of taxi.

DETAILED DESCRIPTION

The specific embodiment of the present invention is described below in detail in conjunction with examples, and implementation effects of the present invention are simulated.

1 Study Object

Figure 1:
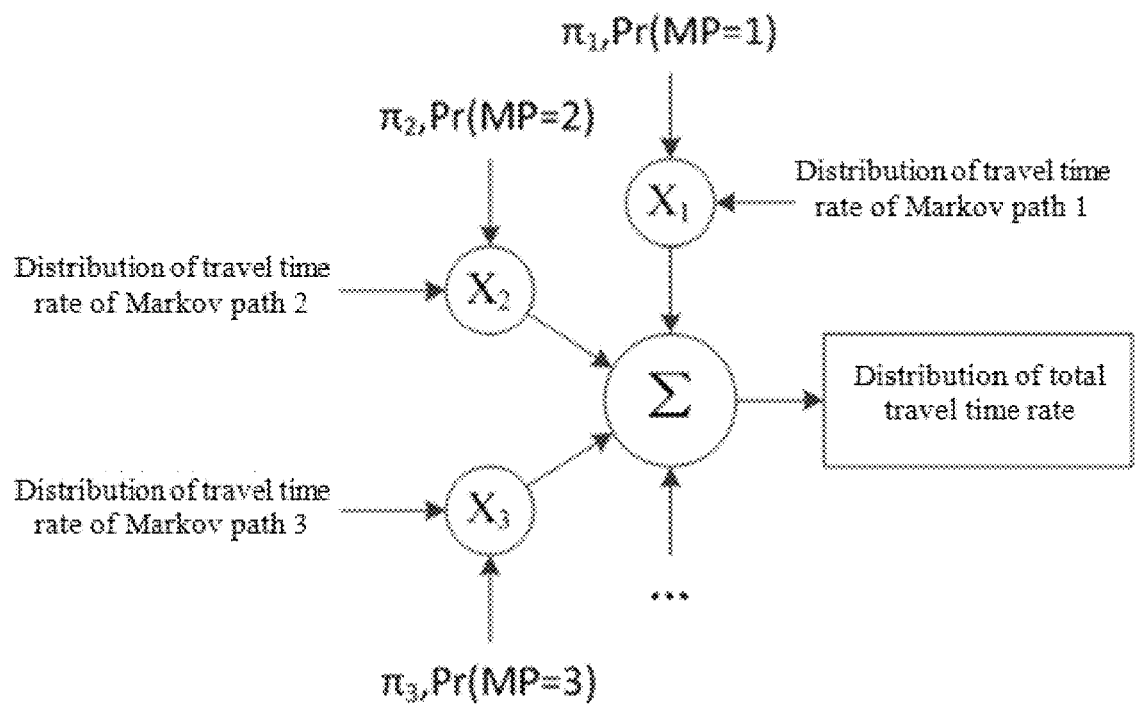
FIG. 1 is a superposing method of vehicle travel time rates of all groups.
Figure 2:
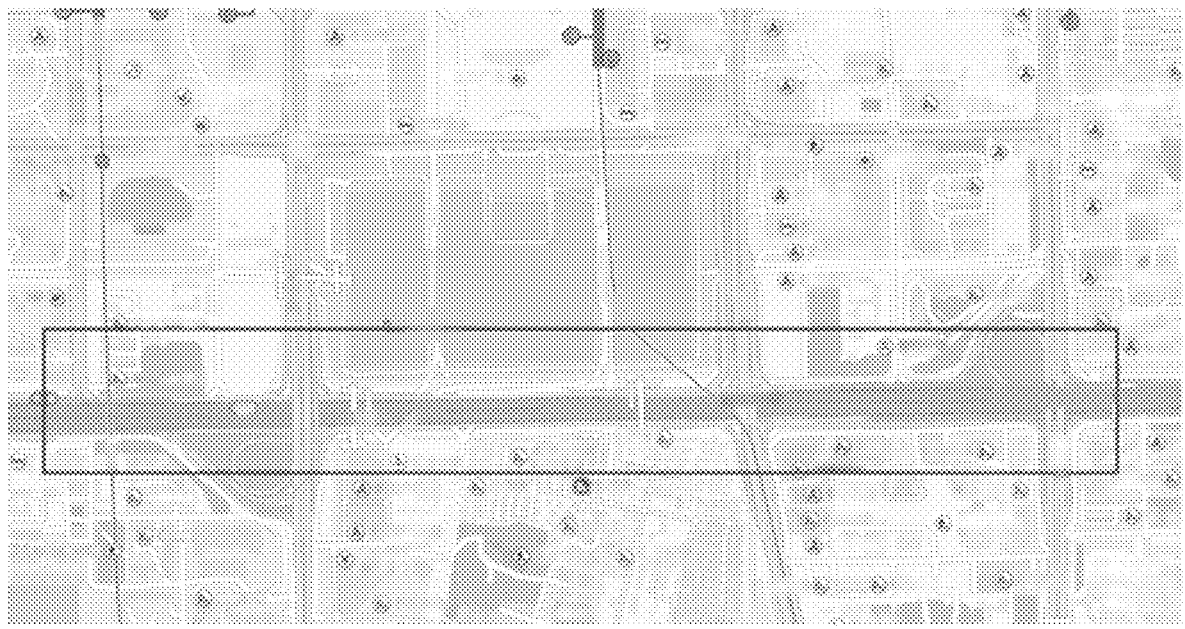
FIG. 2 is a schematic diagram of a study region.

A road from Caitian road crossing to Mintian road crossing in a direction from east to west on Binhe avenue, Futian district, Shenzhen is selected as a case study object, and the schematic diagram of the study region is shown in FIG. 2. Binhe avenue is one of three main roads in Shenzhen, adjacent to Shenzhen Convention and Exhibition Center, shopping park and other business centers as well as Futian Port, having large traffic flow. The actual data of all the taxi on three road sections from Caitian road crossing to Mintian road crossing in the direction from east to west on Binhe avenue, Futian district, Shenzhen on Jun. 10, 2014 are used.

2 Distribution of Road Section Travel Time

Because the distribution of taxi flowrate and the distribution of the passenger ratio of taxi from 14:00 to 17:00 are consistent, the data of the taxi running from east to west in this time period is selected. The running states of the taxi are divided into two categories of running states of "fast" and "slow" through a K-means clustering method. All the road sections under each operation state are respectively clustered.

Figures 3A, 3B:
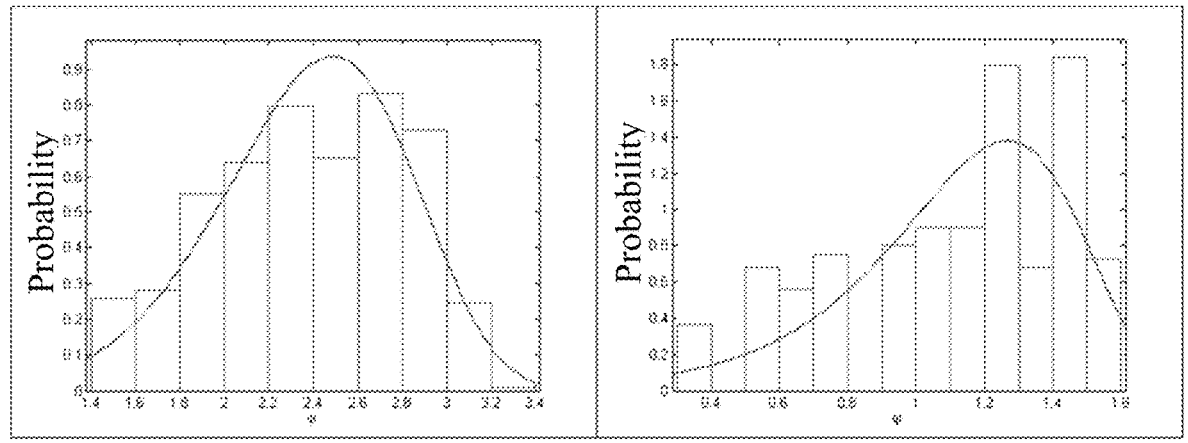
FIG. 3(a) is an image of a probability density function of travel time rates under "fast" state of link1 under state of no passenger.
FIG. 3(b) is an image of a probability density function of travel time rates under "slow" state of link3 under state of no passenger.

The travel time rate of each road section under each operation state is counted, and then distributions of the travel time rates under different running states are respectively fitted. Because the difference value between travel times of unit distance becomes smaller when the speed becomes higher, fitting difficulty and errors may be generated. Therefore, $\Psi_i = -\ln_i$ (i=1, 2, 3 . . . ) during calculation so as to reduce the errors. Fitting results are shown in Table 1, Table 2 and Table 3. Function images of some fitting results are shown in FIG. 3(a) and FIG. 3(b).

TABLE 1

Fitting types and parameter estimation values of probability density functions for travel time rates of all running states of all road sections under state of no passenger

| Road Section | Running State | Fitting Model | Parameter 1 | Parameter 2 | Parameter 3 |
| --- | --- | --- | --- | --- | --- |
| Link1 | slow | Rayleigh Distribution | σ = 0.64539 | — | — |
|  | fast | Weibull Distribution | λ = 2.55194 | k = 6.41065 | — |

TABLE 1-continued

Fitting types and parameter estimation values of probability density functions for travel time rates of all running states of all road sections under state of no passenger

| Road Section | Running State | Fitting Model | Parameter 1 | Parameter 2 | Parameter 3 |
|---|---|---|---|---|---|
| Link2 | slow | Logical Distribution | $\mu = 0.72405$ | $s = 0.12057$ | — |
|  | fast | Logarithmic Normal Distribution | $\mu = 0.53815$ | $\sigma = 0.23328$ | — |
| Link3 | slow | Extreme Value Distribution | $\mu = 1.26639$ | $\sigma = 0.$ | — |
|  | fast | Extreme Value Distribution | $\mu = 1.25064$ | $\sigma = 0.26810$ | — |

TABLE 2

Fitting types and parameter estimation values of probability density functions for travel time rates of all running states of all road sections under state of passenger service

| Road Section | Running State | Fitting Model | Parameter 1 | Parameter 2 | Parameter 3 |
|---|---|---|---|---|---|
| Link1 | slow | Generalized Extreme Value Distribution | $k = 0.28429$ | $\sigma = 0.16360$ | $\mu = 0.53952$ |
|  | fast | Extreme Value Distribution | $\mu = 2.77978$ | $\sigma = 0.26821$ | — |
| Link2 | slow | Logarithmic Logical Distribution | $\mu = -0.32648$ | $\sigma = 0.18297$ | — |
|  | fast | Gamma Distribution | $k = 17.9535$ | $\theta = 0.10330$ | — |
| Link3 | slow | Extreme Value Distribution | $\mu = 1.22637$ | $\sigma = 0.26836$ | — |
|  | fast | Logarithmic Normal Distribution | $\mu = 0.74542$ | $\sigma = 0.14780$ | — |

TABLE 3

Fitting types and parameter estimation values of probability density functions for travel time rates of all running states of all road sections under all states

| Road Section | Running State | Fitting Model | Parameter 1 | Parameter 2 | Parameter 3 |
|---|---|---|---|---|---|
| Link1 | slow | Generalized Extreme Value Distribution | $k = 0.14414$ | $\sigma = 0.22877$ | $\mu = 0.60760$ |
|  | fast | Weibull Distribution | $\lambda = 2.70414$ | $k = 8.15789$ | — |
| Link2 | slow | Logarithmic Logical Distribution | $\mu = 0.34315$ | $s = 0.18792$ | — |
|  | fast | Weibull Distribution | $\lambda = 1.98122$ | $k = 4.67084$ | — |
| Link3 | slow | Extreme Value Distribution | $\mu = 0.72107$ | $\sigma = 0.26810$ | — |
|  | fast | Logarithmic Normal Distribution | $\mu = 1.25064$ | $\sigma = 0.14304$ | — |

3 Distribution of Path Travel Time

Under three different operation states, the middle road sections Link2, when used as a downstream road section and an upstream road section, are consistent in state classification. Therefore, 8 Markov paths can be directly constituted to meet use conditions of case 1. Markov chain models are constructed respectively for the data under the state of no passenger and the state of passenger service. The initial probability distribution under each operation state is shown in Table 4. Probability transfer matrix results are shown in Table 5, Table 6 and Table 7. The occurrence probability of each Markov path is shown in Table 8, Table 9 and Table 10.

TABLE 4

Initial probability distribution under each operation state

| Operation State | Running State | Initial Probability |
|---|---|---|
| No Passenger | [0, 2.708050) | 0.246154 |
|  | [2.708050, ∞) | 0.753846 |
| Passenger Service | [0, 1.810109) | 0.104938 |
|  | [1.810109, ∞) | 0.895062 |
| Total State | [0, 1.663505) | 0.182073 |
|  | [1.663505, ∞) | 0.817927 |

TABLE 5

Probability transfer matrix of Markov chain models under state of no passenger

| | Link 2 | | |
|---|---|---|---|
| Link 1 | [0, 2.397895) | [2.397895, ∞) | Summation |
| [0, 2.708050) | 0.708333 | 0.291667 | 1 |
| [2.708050, ∞) | 0.578231 | 0.421769 | 1 |

| | Link 3 | | |
|---|---|---|---|
| Link 2 | [0, 2.890372) | [2.890372, ∞) | Summation |
| [0, 2.397895) | 0.747899 | 0.252101 | 1 |
| [2.397895, ∞) | 0.666667 | 0.333333 | 1 |

TABLE 6

Probability transfer matrix of Markov chain models under state of passenger service

| | Link 2 | | |
|---|---|---|---|
| Link 1 | [0, 2.547707) | [2.547707, ∞) | Summation |
| [0, 1.810109) | 0.647059 | 0.352941 | 1 |
| [1.810109, ∞) | 0.593103 | 0.406897 | 1 |

TABLE 6-continued

Probability transfer matrix of Markov chain models under state of passenger service

| | Link 3 | | |
|---|---|---|---|
| Link 2 | [0, 1.552279) | [1.552279, ∞) | Summation |
| [0, 2.547707) | 0.656627 | 0.343373 | 1 |
| [2.547707, ∞) | 0.453333 | 0.546667 | 1 |

TABLE 7

Probability transfer matrix of Markov chain models under total states

| | Link 2 | | |
|---|---|---|---|
| Link 1 | [0, 2.503255) | [2.503255, ∞) | Summation |
| [0, 1.663505) | 0.647059 | 0.352941 | 1 |
| [1.663505, ∞) | 0.593103 | 0.406897 | 1 |

| | Link 3 | | |
|---|---|---|---|
| Link 2 | [0, 1.552279) | [1.552279, ∞) | Summation |
| [0, 2.503255) | 0.656627 | 0.343373 | 1 |
| [2.503255, ∞) | 0.453333 | 0.546667 | 1 |

TABLE 8

Occurrence probability of each Markov path under state of no passenger

| Markov Path | Probability |
|---|---|
| S1 = i11, S2 = i12, S3 = i13 | 0.130403 |
| S1 = i11, S2 = i12, S3 = i23 | 0.043956 |
| S1 = i11, S2 = i22, S3 = i13 | 0.047863 |
| S1 = i11, S2 = i22, S3 = i23 | 0.023932 |
| S1 = i21, S2 = i12, S3 = i13 | 0.326007 |
| S1 = i21, S2 = i12, S3 = i23 | 0.109890 |
| S1 = i21, S2 = i22, S3 = i13 | 0.211966 |
| S1 = i21, S2 = i22, S3 = i23 | 0.105983 |

TABLE 9

Occurrence probability of each Markov path under state of passenger service

| Markov Path | Probability |
|---|---|
| S1 = i11, S2 = i12, S3 = i13 | 0.044586 |
| S1 = i11, S2 = i12, S3 = i23 | 0.023315 |
| S1 = i11, S2 = i22, S3 = i13 | 0.016790 |
| S1 = i11, S2 = i22, S3 = i23 | 0.020247 |
| S1 = i21, S2 = i12, S3 = i13 | 0.348580 |
| S1 = i21, S2 = i12, S3 = i23 | 0.182285 |
| S1 = i21, S2 = i22, S3 = i13 | 0.165103 |
| S1 = i21, S2 = i22, S3 = i23 | 0.199095 |

TABLE 10

Occurrence probability of each Markov path under state of total states

| Markov Path | Probability |
|---|---|
| $S_1 = i_1^1, S_2 = i_1^2, S_3 = i_1^3$ | 0.089546 |
| $S_1 = i_1^1, S_2 = i_1^2, S_3 = i_2^3$ | 0.036505 |
| $S_1 = i_1^1, S_2 = i_2^2, S_3 = i_1^3$ | 0.030558 |
| $S_1 = i_1^1, S_2 = i_2^2, S_3 = i_2^3$ | 0.025465 |
| $S_1 = i_2^1, S_2 = i_1^2, S_3 = i_1^3$ | 0.340274 |
| $S_1 = i_2^1, S_2 = i_1^2, S_3 = i_2^3$ | 0.138718 |
| $S_1 = i_2^1, S_2 = i_2^2, S_3 = i_1^3$ | 0.184874 |
| $S_1 = i_2^1, S_2 = i_2^2, S_3 = i_2^3$ | 0.154062 |

Figure 4:
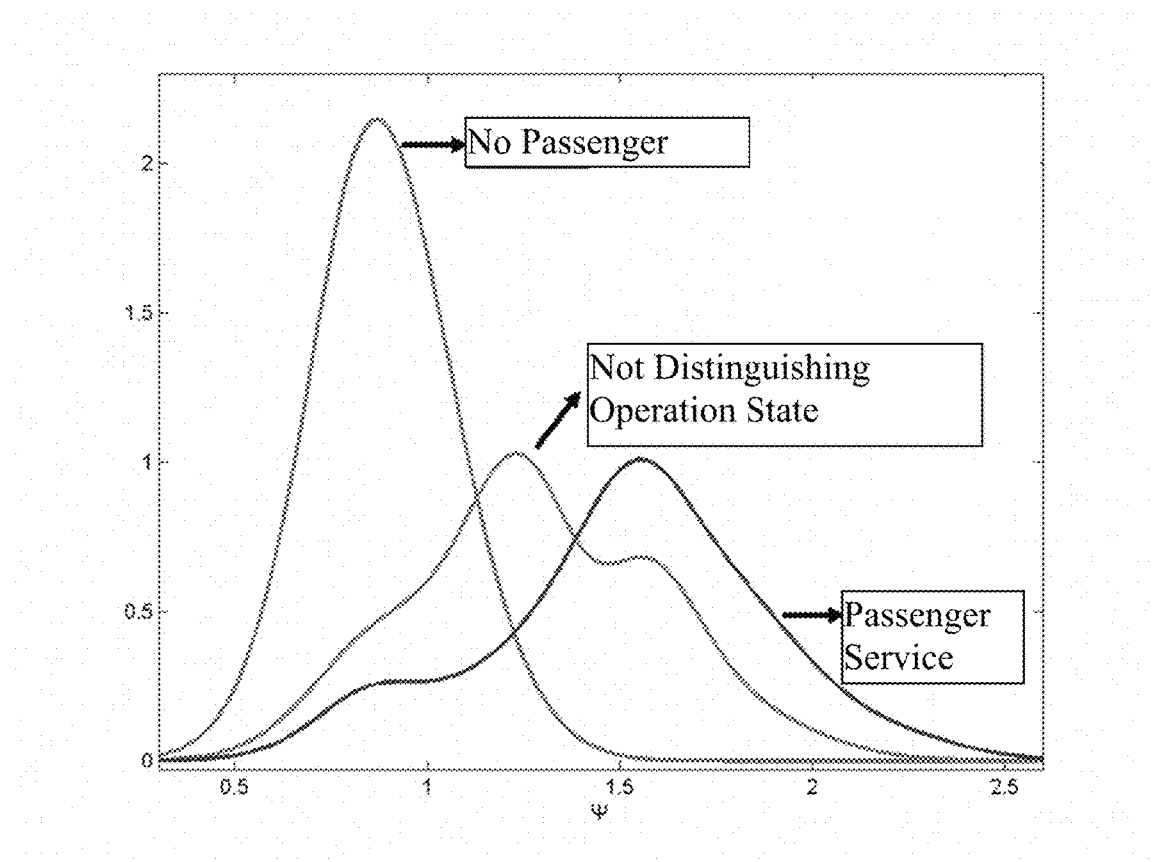
FIG. 4 is a probability density distribution curve of path travel time rates under states of no passenger and passenger service.
Figure 5:
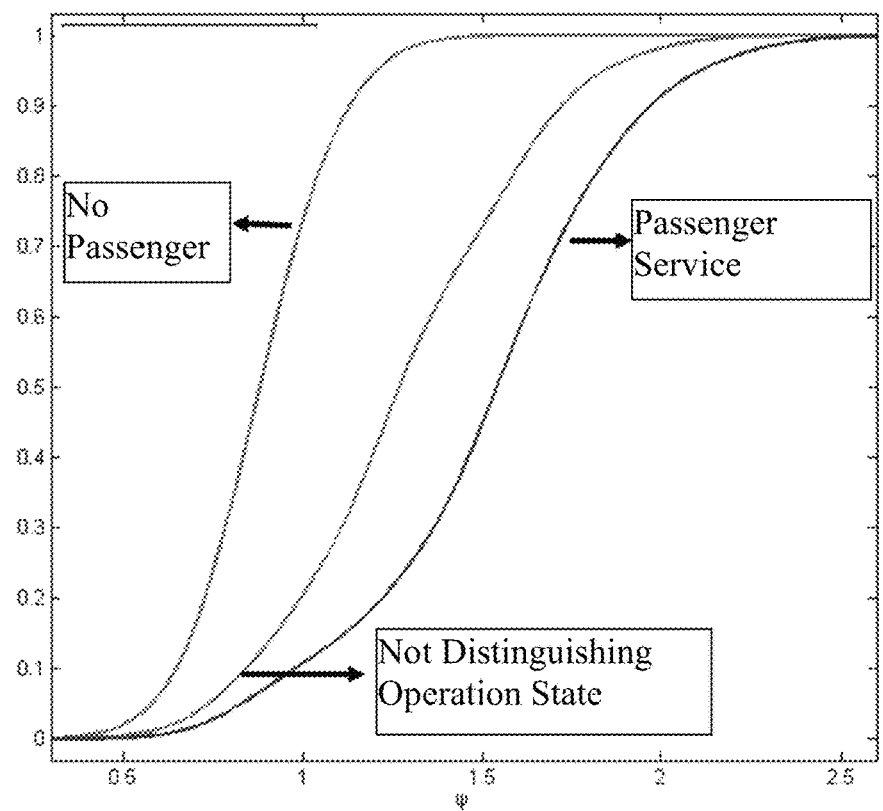
FIG. 5 is a cumulative probability distribution curve of path travel time rates under states of no passenger and passenger service.

The probability density function of the travel time rate of the road section under each operation state and each running state and the occurrence probability of each Markov path are calculated; and then the total path travel time under each operation state can be calculated according to the constructed model, as shown in FIG. 4 and FIG. 5. It can be seen from the figure that: in the state of no passenger, the position of the peak of the distribution curve of the probability density function is quite different from the position of the peak in the state of passenger service. Namely: the path travel time rate estimated in the state of no passenger is obviously lower than the path travel time rate without distinguishing the operation states; and the path travel time rate estimated in the state of passenger service is obviously higher than the path travel time rate without distinguishing the operation states. Through calculation, 85 quantiles of the path travel time rate without distinguishing the operation state is 1.7259, i.e., the path travel time is 275.92 seconds; 85 quantiles under the state of no passenger is 1.1362, i.e., the path travel time is 497.61 seconds, increased by 80.35% than that without distinguishing the operation state; 85 quantiles is 1.9047 under the state of passenger service, i.e., the path travel time is 230.74 seconds, decreased by 16.37% than that without distinguishing the operation state and decreased by 53.63% than that under the state of no passenger. It indicates that the driving behaviors and decisions of the taxi drivers under different operation states are different, causing an obvious difference in distribution situations of respective travel time rates. Therefore, the operation states of the taxi have a great influence on the estimation of the path travel time. Moreover, the distribution situations of the travel time rates under two operation states of no passenger and passenger service may also be different according to the passenger ratio of taxi and have a great influence on the final estimated value.

3. Comparison of Simulation Results

To compare the accuracy of the estimation methods of the path travel time under the states of distinguishing the operation state and not distinguishing the operation state and analyze the significance of the influence of the operation states on the estimation of the path travel time, the road network is abstracted and studied through VISSIM software to simulate the running states of the taxi under the states of no passenger and passenger service and the running states of all the vehicles including taxi, social vehicles, buses and the like, so as to compare the distribution situations of the path travel time estimated by the methods.

Figure 6:
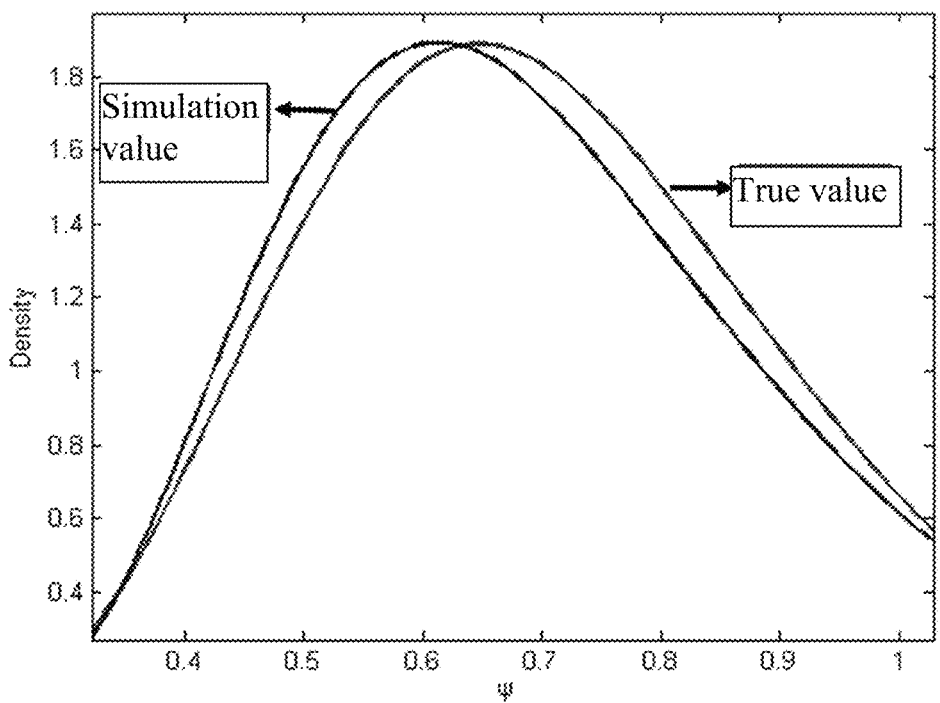
FIG. 6 is a schematic diagram (part) of comparison between a true value and a simulation value of distribution of travel time rates of road sections.

The simulation model is established according to a real road network in the study region, to simulate the road network including three three-lane unidirectional road sections and three three-lane ramps. The total simulation duration is 5000 seconds; different random seeds are used for simulation for 10 times; and the data with the total duration of 1 hour from 1000th second to 4600th second is used for analysis, wherein the inlet flowrate of the main road is 10080 pcu/h, the inlet flowrate of the branch road is 800 pcu/h, the proportion of the taxi is 0.244 and the passenger ratio of taxi is 0.736. The velocity distribution within the time period of 1 hour from 15:00 to 16:00 is taken as the velocity distribution under the states of no passenger and passenger service of the taxi; the average value of 53.1 km/h is taken as the velocity distribution of other social vehicles, following double-logarithmic normal distribution. The simulation results of the distribution of the travel time rate of each road section of the vehicles under two states of passenger service and no passenger are corrected through adjustment of the simulation parameters. As shown in FIG. 6, the result obtained by simulation of the corrected model is basically consistent with an actual value, which indicates that the corrected model can be used to simulate actual road traffic flows.

Figure 7:
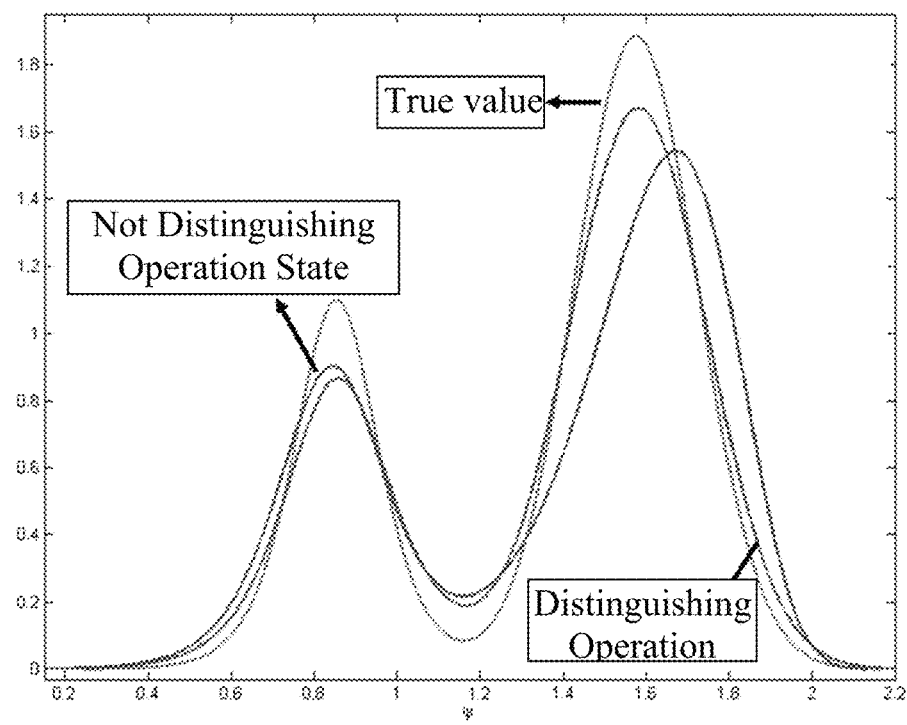
FIG. 7 is a comparison diagram of probability density distribution of travel time rates estimated by distinguishing and not distinguishing operation states and probability density distribution of true travel time rates.
Figure 8:
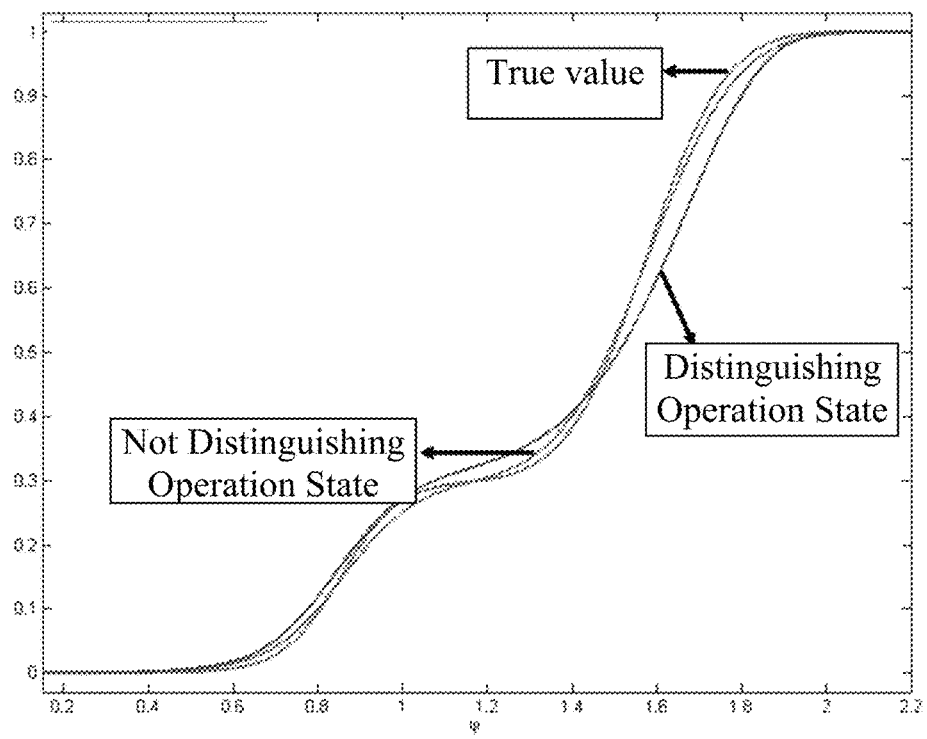
FIG. 8 is a comparison diagram of cumulative probability distribution of travel time rates estimated by distinguishing and not distinguishing operation states and cumulative probability distribution of true travel time rates.

FIG. 7 is a comparison diagram of probability density distribution of travel time rates estimated by the methods and probability density distribution of true travel time rates. FIG. 8 is a distribution diagram of cumulative probability. The result by distinguishing the operation states is the result estimated by formula (13).

Precision analysis is made to the estimated results of two assessment indexes through a mean absolute error and a maximum percent error.

$$MAE = \frac{1}{RANGE} \int_{-\infty}^{+\infty} |TTRD_{estimated}(x) - TTRD_{real}(x)| dx \quad (14)$$

$$PE_{max} = \max \frac{|TTRD_{estimated}(x) - TTRD_{real}(x)|}{TTRD_{real}(x)} \quad (15)$$

wherein $TTRD_{estimated}$ and $TTRD_{real}$ respectively represent the distribution function for estimating the travel time rate and the probability density distribution function for actual travel time rate; and RANGE represents an effective section length of the distribution function. Calculation results of respective MAE and $PE_{max}$ under the state of distinguishing the vehicle operation states (improved method) and the state of not distinguishing the vehicle operation states (original method) are shown in Table 11. It can be known that the errors are obviously decreased, the mean absolute error is decreased by 51.44% and the maximum percent error is decreased by 46.83% after the vehicle operation states are distinguished. Therefore, the estimation accuracy can be increased to a large degree by the new method for estimating the path travel time after considering the operation states of the taxi.

TABLE 11

Comparison of difference values of probability density distribution obtained by two estimation methods of distinguishing operation state and not distinguishing operation state

|  | MAE (×10$^{-4}$) | PE$_{max}$ (%) |
|---|---|---|
| Distinguishing operation state | 21.93 | 13.49 |
| Not distinguishing operation state | 45.16 | 25.37 |

The model in the formula (13) is used to estimate the distribution of the total path travel time rate, and the obtained value is compared with the path travel time rate and the true value under the existing method (i.e., not distinguishing the operation state). It can be obviously seen that the cumulative distribution of the total path travel time rate obtained by each estimation method has an obvious error. Three quantiles are compared, as shown in Table 12. The error of the estimation method of distinguishing the operation state is greatly smaller than the error of the estimation method of not distinguishing the operation state. After improvement by the algorithm, the error absolute value of 15 quantiles is decreased by 70.73%, the error absolute value of a median is decreased by 33.90% and the error absolute value of 85 quantiles is decreased by 70.94%. Therefore, this proves once again that the method proposed by the present invention can greatly increase the accuracy of estimating the path travel time by using the taxi data.

TABLE 12

Comparison of cumulative probability distribution quantile obtained by two estimation methods of distinguishing operation state and not distinguishing operation state

| | True State | Distinguishing Operation State | | | Not Distinguishing Operation State | | |
|---|---|---|---|---|---|---|---|
| Quantile | Value (s/m) | Value (s/m) | Absolute Error (s/m) | Relative Error (%) | Value (s/m) | Absolute Error (s/m) | Relative Error (%) |
| 15 quantiles | 0.4255 | 0.4232 | −0.0024 | −0.5584 | 0.4338 | 0.0082 | 1.9390 |
| median | 0.2249 | 0.2210 | −0.0039 | −1.7500 | 0.2191 | −0.0059 | −2.6055 |
| 85 quantiles | 0.1840 | 0.1806 | −0.0034 | −1.8526 | 0.1723 | −0.0117 | −6.3700 |

1) In "absolute error" and "relative error", the positive number indicates that the estimated value is greater than the actual value, and the negative number indicates that the estimated value is less than the actual value.
2) "Value" is the actual value or estimated value of the travel time rate.

We claims:

1. A method for estimating distribution of urban road travel time in considering operation state of taxi, comprising the following steps:

(1) distribution of road section travel time screening, correcting and matching collected taxi GPS data according to road sections and time periods to be researched to obtain the taxi GPS data containing license plate numbers, precision, longitudes, latitudes, speeds and passenger carrying state fields on various road sections;

calculating an average speed of the taxi having the same license plate number according to the taxi GPS data, and calculating a travel time rate of the taxi having the same license plate number through a formula (1) according to the average speed of each taxi:

$$\mathcal{T}_i := 1/v ii=1,2,3\ldots \quad (1)$$

$\mathcal{T}_i$ : travel time on i road section in unit distance, called as the travel time rate, in s/m;

$v_i$ : the average speed of a certain vehicle on the i road section;

establishing taxi data sheets containing the license plate numbers, the longitudes, the latitudes, the travel time rate and the passenger carrying state fields on various road sections; classifying the taxi data sheets according to "no passenger 0" and "passenger service 1" to obtain taxi data sheets with the passenger carrying state as 0 and taxi data sheets with the passenger carrying state as 1; then, clustering the travel time rates in the taxi data sheets with the passenger carrying state as 0 and the taxi data sheets with the passenger carrying state as 1 through a clustering algorithm to obtain data of multiple running states in two operation states; and finally, fitting the travel time rates of the taxi under the same running state to obtain a probability density distribution function of the travel time rates on each road section under each operation state and each running state;

(2) distribution model of path travel time under each operation state (2.1) construction of a Markov chain defining a concentrated distribution interval of the travel time rate of each taxi on a current road section as the state of the Markov chain, wherein $X_1 = \{\chi_1^l, \chi_2^l, \ldots, \chi_{m_l-1}^l\}$ a set of boundary values of link l; $m_l$ is the quantity of states of link l; $Z_l = \{\zeta_1^l, \zeta_2^l, \ldots, \zeta_{n_l-1}^l\}$ a set of boundary values of link l+1; and $n_l$ is the quantity of states of link l+1; therefore, representing the first state of link l as [min $\tau_l$, $\chi_1^l$) and representing the last state as [$\chi_{m_l-1}^l$, max $\tau_l$], wherein $\tau_l$ represents the travel time rate of each taxi on link l;

defining the probability distribution of each running state on the road section link l as the probability distribution of an initial state of the Markov chain:

$$\pi = \begin{bmatrix} \pi_1 \\ \pi_2 \\ \vdots \\ \pi_{m_1} \end{bmatrix} = \begin{bmatrix} \frac{N(1)}{\sum_{i=1}^{m_1} N(i)} \\ \vdots \\ \frac{N(m_1)}{\sum_{i=1}^{m_1} N(i)} \end{bmatrix} \quad (2)$$

wherein N(i) represents the quantity of data points when the travel time rate of link l is within [$\chi_{i-1}^l$, $\chi_i^l$) under state i of the road section link l;

defining the distributions of the travel time rates of two continuous road sections as state transfer probability of the Markov chain, and then representing the probability transfer matrix P in a generate state as:

$$P = \begin{bmatrix} p_{1,1} & \cdots & p_{1,j} \\ \vdots & \ddots & \vdots \\ p_{i,1} & \cdots & p_{i,j} \end{bmatrix} = \begin{bmatrix} \frac{N(1,1)}{\sum_{i=1}^{n_l} N(1,i)} & \cdots & \frac{N(1,n_l)}{\sum_{i=1}^{n_l} N(1,i)} \\ \vdots & \ddots & \vdots \\ \frac{N(m_l,1)}{\sum_{i=1}^{n_l} N(m_l,i)} & \cdots & \frac{N(m_l,n_l)}{\sum_{i=1}^{n_l} N(m_l,i)} \end{bmatrix} \quad (3)$$

$$p_{i,j} = Pr(S_{l+1} = j | S_l = i) \quad (4)$$

wherein $S_l$ represents the state of the road section link l; and N(i,j) represents the quantity of data points which are in i state on the road section link l and in the j state on the road section link l+1;

matched vehicles between the middle road section link l and the downstream road section link l−1 may be different from matched vehicles between the middle road section link l and the downstream road section link l+1; when the middle road section is used as an upstream road section or a downstream road section, classification conditions may be different, and are divided into two cases according to the difference:

(2.2) case 1 when any middle road section link l is used as the upstream road section or the downstream road section, the classifications of the running states are completely consistent; vehicles are in any state of k different states of $Q = \Pi_{l=1}^{k} m_l$, l=1, 2, ... when passing through a path, and each state is called as the Markov path; for the given Markov path, the product of transfer probabilities among all states of all the road sections is the occurrence probability of the Markov path;

$$\Pr\{S_1 = i_1, S_2 = i_2, \ldots, S_k = i_k\} = \pi_{i_1} p_{i_1, i_2}^{S_1, S_2} p_{i_2, i_3}^{S_2, S_3} \cdots p_{i_{k-1}, i_k}^{S_{k-1}, S_k} \quad (5)$$

assuming that the distribution of the travel time rates among all states on the same road section is conditional independent, the distribution of the path travel time rate on a certain Markov path is obtained directly through convolution operation:

$$TTRD\{S_1 = i_1, S_2 = i_2, \ldots, S_k = i_k\} = TTD(i_1^{S_1})^* \\ TTD(i_2^{S_2})^* \cdots * TTD(i_k^{S_k}) \quad (6)$$

in the formula, an operator (*) represents convolution operation, and specific operation rule is expressed as:

$$(TTRD_i * TTRD_j)(t) \triangleq \int_{-\infty}^{\infty} TTRD_i(\tau) TTRD_j(t - \tau) d\tau \quad (7)$$

(2.3) case 2 when any middle road section link l is used as the upstream road section and the downstream road section, the classifications of the states are inconsistent; the state of the Markov chain is revised; transition road sections link' l and link" l are introduced, l=2, 3, ..., k−1, wherein all the states of link' l are equal to those of link l as the downstream road section in the road section link l−1 and the road section link l; all the states of link' l are equal to those of link l as the upstream road section in the road section link l and the road section link l+1; a new road section sequence of the running process of the vehicles on the path is represented as link 1 ... link l−1, link' l, link" l, link l+1, ... link k; $X_l = \{\chi_1^l, \chi_2^l, \ldots, \chi_{m_l-1}^l\}$ used as the set of boundary values of the transition road section link' l, $m_l$ is used as the quantity of states of link' l, $Z_l = \{\zeta_1^l, \zeta_2^l, \ldots, \zeta_{n_l-1}^l\}$ the set of boundary values of the transition road section link" l, $n_l$ is used as the quantity of states of link' l, and $\tau_l$ represents the travel time rate of the taxi on link l; then, the state transfer probability matrix between the transition road section link' l and the transition road section link" l is $$P'_l = \begin{bmatrix} p'_{1,1} & \cdots & p'_{1,m_l} \\ \vdots & \ddots & \vdots \\ p'_{n_l,1} & \cdots & p'_{n_l,m_l} \end{bmatrix} \quad (8)$$

-continued $$p'_{i,j} = Pr(ttr_l \in [\chi^l_{j-1}, \chi^l_j) | ttr_l \in [\zeta^{l-1}_{i-1}, \zeta^{l-1}_i)) = \qquad (9)$$
$$\frac{N(\{ttr_l \in [\chi^l_{j-1}, \chi^l_j) \cap ttr_l \in [\zeta^{l-1}_{i-1}, \zeta^{l-1}_i)\})}{N(\{ttr_l \in [\zeta^{l-1}_{i-1}, \zeta^{l-1}_i)\})}$$

the new constructed Markov chain forms $Q = \Pi_{l=1}^{k-1} m_l \cdot n_l$ Markov paths; for the given new Markov path, the product of transfer probabilities among all states of all the road sections including the transition road section link'l and link"l is the occurrence probability of the Markov paths;

$$Pr\{S_1 = i_1, S_2 = i_2, S'_2 = i'_2, \ldots, S'_{k-1} = i'_{k-1}, S_k = i_k\} = \qquad (10)$$
$$\pi_{i_1} p_{i_1,i_2}^{S_1,S_2} p_{i_2,i'_2}^{S_2,S'_2} \ldots p_{i'_{k-1},i_{k-1}}^{S'_{k-1},S_{k-1}} p_{i_{k-1},i_k}^{S_{k-1},S_k}$$

similarly, introducing the transition road sections link'l and link"l, and using convolution operation to obtain the distribution of the path travel time rates of a certain new Markov path;

$$TTRD\{S_1 = i_1, S_2 = i_2, S'_2 = i'_2, \ldots, S_k = i_k\} = \qquad (11)$$
$$TTD(i_1^{S_1}) * TTD(i_2^{S_2} \cap i_2'^{S'_2}) * \ldots * TTD(i_k^{S_k})$$

(2.4) superposition of distribution of path travel time
superposing the distribution of the travel time rate of each Markov path and the occurrence probability according to the Markov chain to obtain the distribution of the travel time rate of a certain path:

$$TTRD_{route} = \sum_{q=1}^{Q} Pr(Markovpath_q) \cdot TTRD(Markovpath_q) \qquad (12)$$

(3) estimating model of total path travel time
respectively calculating the distributions of the path travel time rates under two operation states through the method in step (2); then setting weights for respective distribution functions according to data amount under two operation states to obtain the calculation formula of the distribution of the total path travel time rate as follows:

$$TTRD(x) = \alpha_0 \cdot ttrd_0(x) + \alpha_1 \cdot ttrd_1(x) \qquad (13)$$

wherein $ttrd_0(x)$ and $ttrd_1(x)$ respectively represent the probability density functions of the total path travel time rate under the state of no passenger and the state of passenger service; and $\alpha_0$ and $\alpha_1$ are proportion parameters which represent the proportion of the vehicles under each operation state in the total amount of the taxi, i.e., a ratio of no passenger and a passenger ratio of taxi.

* * * * *